Figure 1:
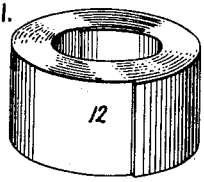

June 17, 1941.  F. F. BRAND  2,246,240
WOUND CORE STATIONARY INDUCTION APPARATUS
Original Filed March 22, 1938   2 Sheets-Sheet 1

Inventor:
Frederick F. Brand,
by Harry E. Dunham
His Attorney.

June 17, 1941.  F. F. BRAND  2,246,240
WOUND CORE STATIONARY INDUCTION APPARATUS
Original Filed March 22, 1938  2 Sheets-Sheet 2

Inventor:
Frederick F. Brand,
by Harry E. Dunham
His Attorney.

Patented June 17, 1941

2,246,240

UNITED STATES PATENT OFFICE 2,246,240

WOUND CORE STATIONARY INDUCTION APPARATUS

Frederick F. Brand, Pittsfield, Mass., assignor to General Electric Company, a corporation of New York Original application March 22, 1938, Serial No. 197,533. Divided and this application December 19, 1940, Serial No. 370,894

1 Claim. (Cl. 175—356)

This application is a division of my copending application, Serial No. 197,533, filed March 22, 1938.

My invention relates to stationary induction apparatus and methods of producing the same.

It is an object of my invention to provide stationary induction apparatus such as transformers and reactors having relatively low losses and relatively low magnetizing currents.

It is an object of my invention to provide such apparatus in which the cost of materials and the cost of manufacturing operations are relatively low.

Other and further objects and advantages will become apparent as the description proceeds.

In carrying out my invention in its preferred form I utilize a current conducting winding or a winding structure including a plurality of windings which has already been wound from current conductors and insulated, and I form a magnetic core for such a winding structure by winding into it one or more strips of magnetic sheet material. The magnetic strip material is wound spirally flat-wise to form an annular core.

In order to remove strains from the magnetic material and give it a set which retains it in its completed form, a core is first wound from the strip material on to a mandrel which has such a diameter that the core so formed would fit closely around the insulated leg of the winding to which it is later to be applied if it could be transferred directly from the mandrel to the winding structure. Such a core is then heat treated or annealed and after the heat treatment has been completed the strip is unwound into a temporary coil of such a diameter that the material will not be stressed beyond its elastic limit or so as to introduce an appreciable permanent deformation in the material. An insulating cylinder or winding form is then placed around the current conducting winding and the strip is wound on to this form from the temporary coil by rotating the winding form and the layers of strip material as they come on to the form. The relative position of the layers of strip material is reversed in the temporary coil and, as the strip material comes around the current conducting winding the original order of layers is reassumed so that when the core is in place on the current conducting winding it has the same shape and the same relationship of layers as when heat treated. Consequently, the magnetic strip material is free from strains and has the shape which it tends to assume by reason of the set produced during the heat treatment. My core winding arrangement is a modification of that previously invented by John C. Granfield and described in his copending application Serial No. 123,249, filed January 30, 1937—Electromagnetic induction apparatus and method of making the same—assigned to the same assignee as the present application and resulting in Letters Patent 2,160,588, granted May 30, 1939.

Figure 2:
Figure 3:
Figure 4:
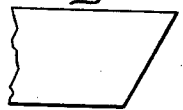
Figure 5:
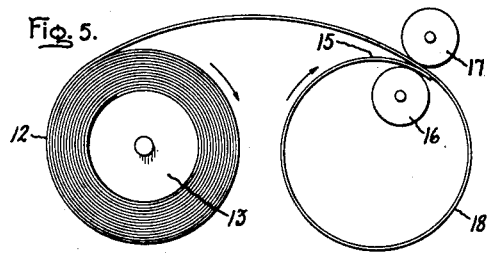
Figure 6:
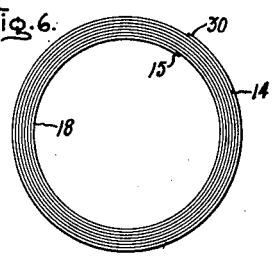
Figure 7:
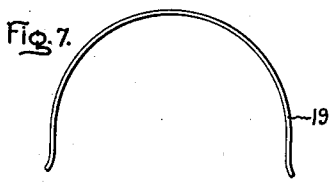
Figure 8:
Figure 9:
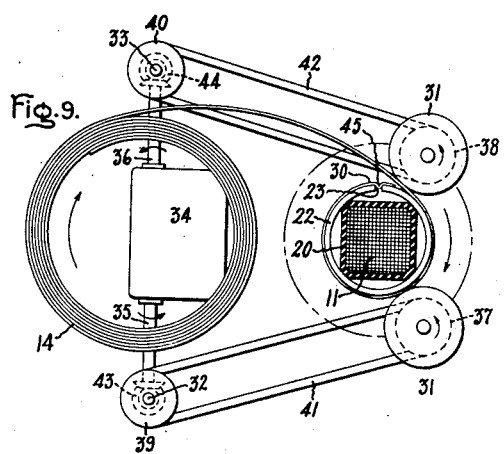
Figure 10:
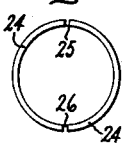
Figure 11:
Figure 12:
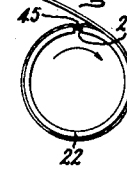
Figure 13:
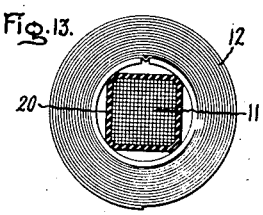
Figure 14:
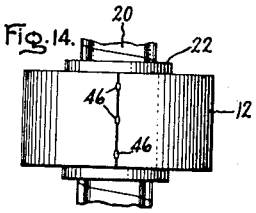
Figure 15:
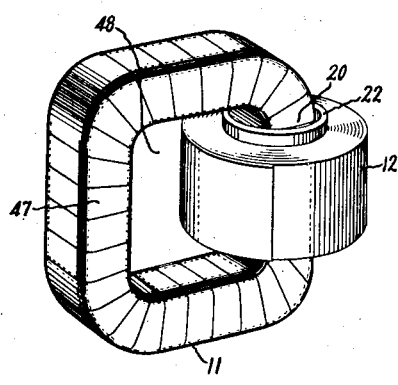
Figure 16:
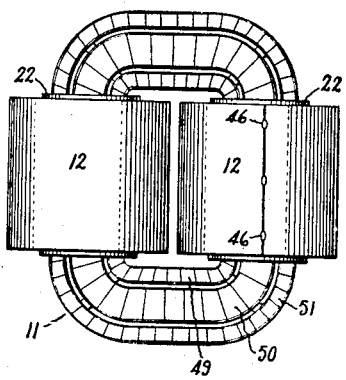
Figure 17:
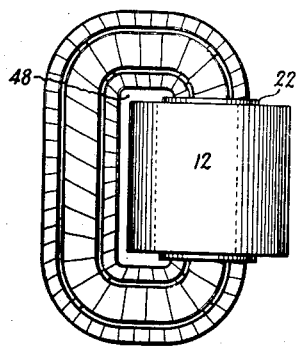

The invention will be understood more readily from the following detailed description when considered in connection with the accompanying drawings, and those features of the invention which are believed to be novel and patentable will be pointed out in the claim appended hereto. In the drawings, Fig. 1 is a perspective view of a coil of magnetic strip material wound to form a core for use in stationary induction apparatus in accordance with my invention. Figs. 2, 3, and 4 are diagrams illustrating shapes to which the ends of the strip material may be cut for convenience in handling and fastening. Fig. 5 is a diagram illustrating one step in the process of preparing the strip material for winding on to the current conducting winding structure. Fig. 6 is a plan view of the strip material wound into a temporary coil. Fig. 7 is a plan view of a clip which may be used for fastening the end turn of the temporary coil. Fig. 8 is a side view of the temporary coil of Fig. 6 with the clip of Fig. 7 in place. Fig. 9 is a diagram illustrating a further step in the operation of winding the strip material on to the current conducting structure and showing one form of machine which may be used for this purpose. Figs. 10, 11 and 12 are views of various types of insulating cylinders or winding forms which may be used for protecting the current conducting winding structure when the magnetic strip material is wound around it. Fig. 13 is a plan view of a wound strip core in a completed stationary induction apparatus showing the current conducting winding structure in cross section. Fig. 14 is an elevation of the apparatus of Fig. 13 with the current conducting winding structure broken away on either side of the wound strip core. Fig. 15 is a perspective view of one embodiment of my invention showing a winding structure with one magnetic core in place. Fig. 16 is an elevation of a transformer constructed in accordance with my invention having two wound strip cores. Fig. 17 is an elevation of a transformer having a single wound strip core. Like reference characters are utilized throughout the drawings to designate like parts.

The current conducting winding structure or the manner in which it is produced does not constitute a part of my present invention, and in producing stationary induction apparatus in accordance with my invention I begin with a fully wound and insulated winding structure such as the winding 11 shown in Fig. 15, for example, and I apply one or more wound strip cores, such as the core 12, to the winding structure.

In order to prepare the magnetic strip material for winding on to the current conducting winding 11, I form the strip material into a coil 12 such as shown in Fig. 1, separate from the current conducting winding structure, but of the same shape and size as it is to have in the completely assembled apparatus. Although I have shown the coil 12 as a circular annulus, it will be understood that my invention is not limited thereto and does not exclude the use of rectangular, elliptical, or oval annuli or rings, e. g., provided the original coil of strip has the same shape and size as it is to have in the finished electromagnetic induction apparatus. Preferably, the coil of Fig. 1 is produced by winding strip material on to a mandrel 13 such as represented in Fig. 5. Preferably means are provided for holding the coil 12 in tightly wound condition, such as a strap or clip or, if desired, tack welds such as those at 46 in Fig. 14 may be used. The wound core is then subjected to a suitable annealing process or heat treatment at such a temperature and for such a length of time as to remove all strains and to give the material a definite set for retaining the shape which it has in the coil shown in Fig. 1. After the heat treatment has been completed and the coil of magnetic strip has cooled any fastening means are removed or tack welds, if used, are broken and the strip is unwound and formed into a temporary coil 14, in which the curvature of the strip is in the same direction as in the coil 12, as shown in Figs. 5 and 6. This may be done, if desired, by gripping the end portion 15 of the magnetic strip between two rollers 16 and 17 and passing it back under to form a loop 18. One of the rollers 16 and 17 is power driven, or if desired, both may be power driven.

The diameter of the inner loop 18 of the temporary coil 14 is so chosen that the material in the strip will not be stressed appreciably beyond its elastic limit. Ordinarily, this is accomplished most conveniently by making the inner diameter of the temporary coil 14 greater than the inner diameter of the coil 12. In the arrangement shown, the inner diameter of the coil 14 is approximately equal to the outer diameter of the coil 12. However, it will be understood that in the case of certain materials, satisfactory results may be obtained by making the inner diameter of the coil 14 less than the inner diameter of the coil 12. If desired, the diameter of the roller 16 may be made equal to the inner diameter of the coil 14, so that the roller 16 becomes a mandrel on to which the temporary coil 16 is wound. In order to hold the strip material in the shape shown in Fig. 6, preparatory to the next operation, the outer end of the strip may be tack welded to the outer surface of the next layer of strip material, or if desired, a clip 19 such as shown in Fig. 7 may be snapped over the coil 14.

The next operation consists of placing a suitable insulating cylinder or tube around the leg 20 of a winding structure 11 around which the magnetic core is to be wound. Although the use of a protecting or insulating cylinder may be omitted in the case of winding structures already having a tough insulation, I prefer to utilize such a cylinder for facilitating the operation of the winding. Various forms of insulating or merely protecting cylinders may be utilized. For example, as shown in Figs. 9 and 12, I may utilize a cylinder 22 cut open at 23, and composed of material which is sufficiently flexible to permit the cylinder 22 to be opened and placed around the winding leg 20. In case a protecting cylinder of stiff or rigid material is to be employed, the cylinder may take the form shown in Fig. 10 consisting of two halves 24 with two breaks at 25 and 26, or a double layer cylinder may be utilized as shown in Fig. 11 in which the pieces 24 are augmented by another pair of cylinder halves 27 placed within the first pair and having breaks 28 and 29 displaced 90 degrees from the breaks 25 and 26 in the outer pieces 24.

When an insulating cylinder such as the cylinder 22 has been placed around the winding leg 20, the coil 14 is opened and the end 30 of the strip is secured thereto, or one turn of the magnetic strip is passed around the cylinder 22 so that rotation of the cylinder and the first layer of the magnetic strip causes strip material to be wound off the temporary coil 14 and on to the insulating cylinder 22 with the turns of the final coil of strip in the same sequence as in the original coil of strip which was annealed. This operation may be performed by hand by rotating the end 30 and the insulating cylinder 22 with it until the completed core 12 has been produced as shown in Figs. 13 and 14. For the sake of carrying out the operation at greater speed and with less labor in the case of large apparatus, a winding machine such as shown in Fig. 9 may be employed having suitable supports, not shown, for the temporary coil 14 and the winding leg 20 and adjustable power driven rollers 31 adapted to engage the strip frictionally. The rollers 31 may be carried by arms (not shown) pivoted at 32 and 33 so that as the wound coil being formed increases in size, the rollers 31 may move apart. For driving the rollers 31 there are provided a motor driven gear box 34 having shafts 35 and 36 rotating in opposite directions, pulleys 37 and 38 each connected to one of the rollers 31, pulleys 39 and 40, belts 41 and 42 joining pulleys 37 and 38 to pulleys 39 and 40, respectively, and bevel gearings 43 and 44 coupling the oppositely rotating shafts 35 and 36 to the pulleys 39 and 40, respectively, in order to drive the rollers 31 in the same angular direction.

Any suitable means may be provided for securing the end 30 of the strip to the insulating cylinder 22 when starting a winding operation, for example, the end of the strip may be bent down at an angle of 90 degrees or a hook may be formed in the end of the strip which will fit in the break 23 of the cylinder 22. Reducing the width of the end of the strip as shown in Figs. 3 and 4 may be helpful. However, I have found that satisfactory operation may be obtained by merely crimping the strip near the end 30 to form the crimp 45 as shown in Figs. 9 and 12. The crimp 45 drops into the break 23 or 25 in the insulating cylinder 22 or 24 and facilitates the winding operation at the start. I have found that if one or more convolutions of the steel strip be wound tightly on the insulating cylinder 22 or 24, and pressure be applied to the outer convolution by rollers 31, that the friction of the inner convolution on the cylinder is sufficient to permit rapid winding of the complete coil of strip upon the cylinder. The deformation of the end of the strip to engage a recess in the cylinder is a means to facilitate the winding operation but is not essential to successfully wind the strip into a coil through the opening of the current conducting winding. After the magnetic strip has been fully wound to form a completed core 12 as shown in Figs. 13 and 14, the end of the strip may be secured in any suitable manner, for example, by means of tack welds 46, as shown in Fig. 14.

Although my invention is not limited to the use of magnetic material having a particular composition, and I have found that there are several different compositions of magnetic material which may be used to produce stationary induction apparatus having low losses and low magnetizing current, I now believe that the best results may be obtained by utilizing high reduction, cold-rolled silicon steel. Good results may also be obtained with a nickel-iron alloy. The high reduction, cold-rolled silicon strip with which I have obtained the best results has a silicon content of about 3 per cent. The process of cold-rolling a magnetic strip with a high reduction is disclosed, for example, in Patent 1,915,766 of January 27, 1933, to Smith et al., patents to Freeland 1,932,306-7-8-9 of October 24, 1933, and Goss Patent 1,965,559 of July 31, 1934. The process is a general one applicable to nickel-iron alloys and silicon steel and is, in brief, characterized by hot-rolling to a thickness considerably greater than the finished size followed by annealing, and a further reduction of about 60 per cent by cold-rolling to the finished size and then heat-treating. The quality, if desired, may be improved somewhat by a further step of high reduction cold-rolling and further heat-treating. Such a cold-rolled strip has the most favorable magnetic orientation of the grain along the length of the strip and my method of producing magnetic cores from strip material makes it possible to make use of this favorable magnetic orientation.

If desired, a plurality of cores may be wound on to a current conducting winding structure either on different legs of the winding structure, or on different portions of the same leg, or if desired, a plurality of concentric cores may be provided, one of which is formed about the other. In Fig. 15 a single winding 11 is shown with a single core 12 but preferably a second core is wound about the other leg 47 of the winding 11 in order that the core material will substantially fill the window 48 formed in the winding structure and provide maximum efficiency for the copper employed in the current conducting winding. The relationship of two strip wound cores is shown in Fig. 16. In Fig. 16, the winding structure 11 consists of a plurality of windings 49, 50 and 51, the widths of which may be made different so that the core winding forms 22 may be substantially filled and the maximum utilization is obtained of both current conducting winding material and magnetic material. If only one wound core 12 is to be employed, the winding structure may be shaped as illustrated in Fig. 17 in order to have the window 48 substantially filled by magnetic core material.

In accordance with the provisions of the patent statutes, I have described the principle of operation of my invention together with the apparatus which I now consider to represent the best embodiment thereof but I desire to have it understood that the apparatus shown is only illustrative and that the invention may be carried out by other means.

What I claim as new and desire to secure by Letters Patent of the United States is:

Stationary induction apparatus comprising a current conducting winding structure, an insulating tube surrounding one leg of the winding structure, said tube having a groove cut therein axially, a coil of magnetic strip material wound into a core surrounding said insulating tube, the inner end of said strip having a crimp fitting into the groove in said tube.

FREDERICK F. BRAND.